(12) United States Patent
Messerly et al.

(10) Patent No.: US 6,381,661 B1
(45) Date of Patent: Apr. 30, 2002

(54) HIGH THROUGHPUT UART TO DSP INTERFACE HAVING DUAL TRANSMIT AND RECEIVE FIFO BUFFERS TO SUPPORT DATA TRANSFER BETWEEN A HOST COMPUTER AND AN ATTACHED MODEM

(75) Inventors: Shayne Messerly, Farmington; Harrison Killian, Kaysville; David Arnesen, West Jordan, all of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/321,905

(22) Filed: May 28, 1999

(51) Int. Cl.$^7$ .......................... G06F 13/12; G06F 13/38
(52) U.S. Cl. .............................. 710/63; 710/52; 710/129
(58) Field of Search .............................. 710/1–5, 52–57, 710/62, 63, 106, 129, 130; 711/100, 109, 110; 703/24

(56) References Cited

U.S. PATENT DOCUMENTS

| | | | |
|---|---|---|---|
| 4,156,931 A | | 5/1979 | Adelman et al. ........... 364/900 |
| 4,258,418 A | * | 3/1981 | Heath .......................... 710/53 |
| 5,038,277 A | * | 8/1991 | Altman et al. ................ 710/56 |
| 5,133,078 A | * | 7/1992 | Minassian et al. ............ 710/52 |
| 5,187,591 A | | 2/1993 | Guy et al. ................... 358/425 |
| 5,822,548 A | * | 10/1998 | Story et al. ................. 710/106 |
| 6,029,221 A | * | 2/2000 | Wu et al. .................... 710/129 |
| 6,145,016 A | * | 11/2000 | Lai et al. ....................... 710/4 |
| 6,161,160 A | * | 12/2000 | Niu et al. .................... 710/129 |
| 6,272,452 B1 | * | 8/2001 | Wu et al. ...................... 703/24 |

* cited by examiner

Primary Examiner—Thomas Lee
Assistant Examiner—Thuan Du
(74) Attorney, Agent, or Firm—Workman, Nydegger & Seeley

(57) ABSTRACT

The high throughput UART to DSP interface (UDIF) maintains UART functionality while integrating dual Transmit (Tx) and Receive (Rx) FIFO buffers that are optimized for more efficient interaction with their respective I/O processors. The portion of the interface design interacting with the DSP, the UDIF, provides several unique Status, Informational, and Control registers that lower the DSP overhead required for many of the basic modem functions. The UDIF design also performs parity add, parity strip, and character echo functions, traditionally performed at a high overhead cost by the DSP. These functions are more efficiently preformed by hardware implementations than by the software routines executed by the DSP. More burdensome command functions like escape, AT, and flow control commands can also be implemented through hardware implementations to reduce processor overhead.

28 Claims, 3 Drawing Sheets

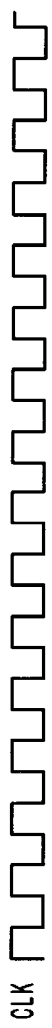
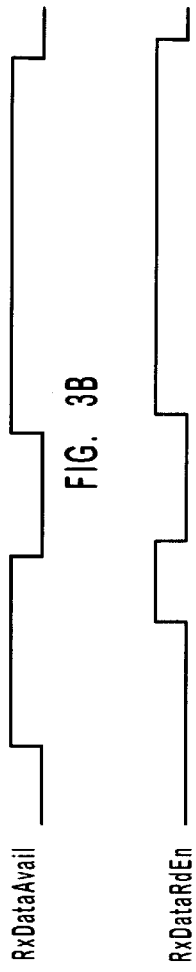
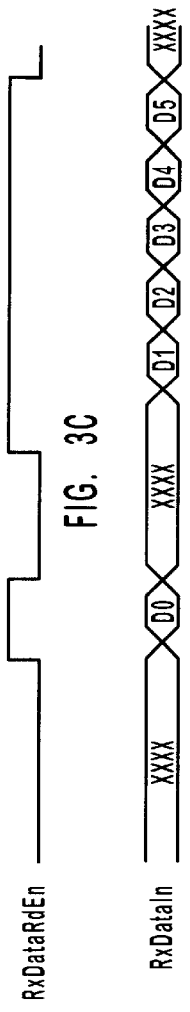
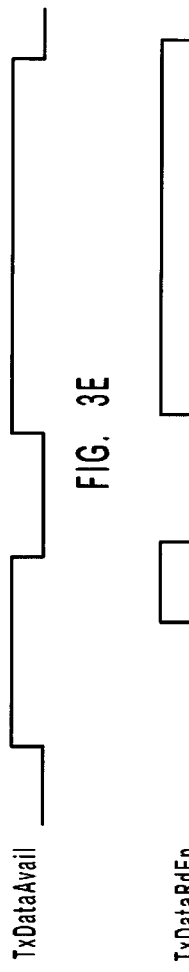
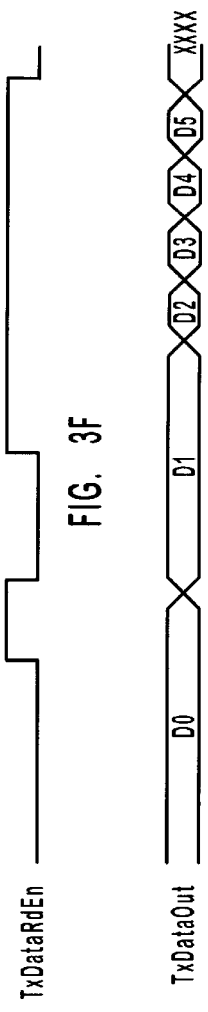

HIGH THROUGHPUT UART TO DSP INTERFACE HAVING DUAL TRANSMIT AND RECEIVE FIFO BUFFERS TO SUPPORT DATA TRANSFER BETWEEN A HOST COMPUTER AND AN ATTACHED MODEM

BACKGROUND OF THE INVENTION

1. The Field of the Invention

The present invention relates to the field of modem communications between a host computer, and an attached modem, across networks. More specifically the invention relates to a high throughput interface between a modem's Digital Signal Processor (DSP) and a computer's internal Universal Asynchronous Receiver Transmitter (UART) interface.

2. The Relevant Technology

The demands of recent software and hardware enhancements upon computer communication technology require changes to the standard hardware configuration. One computer component device that traditionally lags behind other computer system enhancements is the serial port modem interface on the personal computer. The first modems were in an external box linked to the computer via a serial cable connection. The external modem converted the serial information into analog modules for transmission across the phone lines. In this configuration, there was generally some type of UART inside of the serial port on the computer and the serial port of the modem. The computer UART would take parallel information, serialize it, and then send it across the serial cable. The modem UART would then translate information so that the modem could modulate the information for transmission. In the case of modern internal modems and PCMCIA modems, serial connection cables are not utilized, creating faster modem communication. Unfortunately, a substantial amount of legacy software expects the original UART configuration to convert the parallel data into serial data strands. This unnecessary hardware device is often blamed as the bottleneck for data transfers and the source of poor computer response. Typically, the computer user will notice substantial lag time from the computer's central processing unit (CPU) whenever the CPU attempts to service interrupt requests involving large data transfer operations with the UART. On the other side of the local communications link, the DSP of the modern modem is also severely overburdened. Servicing multiple interrupts from the UART can drastically affect the performance and effectiveness of the DSP.

Today, the minimum serial port interface device that any modem modem should use is a 16550 UART. Lower speed devices like the 8250 UART and 16450 UART cannot operate at the speeds dictated by modem modem standards without risking data overrun errors. An overrun error occurs when a new character is received before the old character has been fetched by the computer. Once this occurs the old character is lost and unavailable for processing by the personal computer.

The original UART chip shipped with the IBM® personal computer was the 8250 UART. The 8250 UART chip was limited to a maximum data transfer rate of 9600 bits per second (bps). This chip was later replaced with the 16540 UART chip which had the same architecture as the 8250 UART; but a higher maximum bps specification. Both of these chips only had a one byte buffer. Since each character is designated by eight bits, the buffer on the 8250 UART and 16540 UART corresponded to one character. Under the DOS platform, the one byte buffer of the 8250 and 16540 UARTs provided satisfactory performance for the communication ports operating at speeds of lower than 9600 bps.

Computer designers developed the UART chips to function at 9600 bps because this speed corresponded with the performance requirements found in the underlying Microsoft® specification for the DOS systems shipped with the original IBM personal computers. A closer look at the Microsoft DOS timing specifications reveals that an interrupt was not to be disabled for more than one millisecond at a time. While an interrupt is disabled the CPU will not process send/receive requests with the communications port. Because a 9600 bps modem will deliver a character approximately every millisecond, the one byte buffer on the UART chips was sufficient to prevent data over-run errors.

This changed under the new multi-tasking Windows 3.1 operating system. There is no longer an imposed restriction on the interrupt response control as previously existed under the DOS timing specification. As a result, interrupts could be ignored longer and repeated interrupts could be handled faster. To prevent over-run errors, the 16540 UART architecture was limited to operating between 1200 and 2400 bps under the Windows operating system. This was unsatisfactory because the new modems were capable of much higher transfer rates. A serial communications port needed to operate at transfer rates of at least 38,400 bps to keep up with the faster modems. But once data transfer rates climb above 9600 bps, then the device can receive a new character before the old one has been fetched by the interrupt service routine.

When the older 8250 and 16540 UART devices were forced to perform at higher speeds, their one character buffers guaranteed over-run errors. To fix this problem, the 16550 UART was developed. It had a 16 byte buffer and was able to operate under the high demand of the new multi-tasking Windows 3.1 system. Modem modems are moving even faster with some operating at 115,200 bps. Thus, a system of buffering is required to prevent over-run errors. For example, a 16 byte buffer may not sound like a huge improvement over the 1 byte buffer, but this allows 16 characters to be received before the computer needs to service the UART data interrupt thereby increasing the maximum data transfer rate that the computer can process reliably, without risk of an over-run error, from 9600 to 153,000 bps if the processor employs a one millisecond interrupt dead time. Obviously, a 32 byte buffer, as found in the 16650 UART, increases the maximum datatransfer rate to over 300,000 bps. Unfortunately, the DOS specification which required a one millisecond maximum interrupt dead time is ignored by Windows 3.1. This means that the dead times become so severe that even speeds of 2400 bps will often result in lost characters and over-runs if using a slower processor.

A secondary benefit to increasing the buffer size over the original 1 byte is that the computer only needs to service the interrupt about 8%–12% of the time. This allows the CPU time for updating the screen or doing other computational chores, thus the computer appears more responsive. But, as the computers get faster, even the 16 and 32 byte standards are becoming ineffective and inefficient Traditionally, the DSP would send an interrupt signal to the UART that would then be passed on to the personal computer telling the computer that data was waiting for it to pick up. Due to the slow transfer rate, the computer could function normally since it could easily handle the interrupt and return to performing its previous program function without any noticeable delay to the user. With new high speed data transfers, the modem DSP is continually waiting for the computer to send or receive more data creating more interrupts and therefore interfering with the overall performance of the personal computer. Thus the interrupt service time of the DSP to UART interface remains a critical feature to the overall performance of the computer. Also the dramatic increase in a modem's transmission capability has created a unique problem for modems, because they must be able to increase the throughput to the computer data bus while maintaining the standard serial protocols associated with UART devices.

Unfortunately, this type of serial connection creates a tremendous overhead burden on the DSP and internal CPU handling the Input/Output Interface. The UART is forced to make several requests for character echo, parity strip, and parity add functions each requiring the DSP to virtually stop work on other projects while the data request is being transferred. What is needed is an intermediate device which can handle the simple flow control functions without hands on supervision by the DSP. More specifically, what is needed is a simple yet reliable hardware solution integrated into the modem which allows for connectivity between the DSP and the portable personal computer at a low cost. This hardware should support the widely available communication software that conforms to the accepted IEEE standards, and should also permit data communication across a conventional telephone network.

SUMMARY AND OBJECTS OF THE INVENTION

An object of the invention is to improve the throughput of a UART to DSP interface and relieve the overhead associated with servicing modem interrupts without losing compatibility with standard UART protocols, especially when performing data transfer operations.

An additional object is to provide the DSP with an efficient method to check and set status flags for various data transfer operations.

Another object is to carry out hardware echo functionality within the hardware interface without excessive DSP involvement.

A further object of the invention is to generate and remove parity from data being transmitted through the hardware interface.

Yet another object is to pace the transfer of data from the UART to the DSP by alternatively bursting and halting data transfers.

Still another object of the invention is to emulate data being serialized through a shift register at a rate established by the DSP while maintaining the advantages of parallel data transfers.

Additional objects, advantages, and novel features of the invention will be set forth in the description which follows, and in part will become apparent to those skilled in the art upon examination of the following or may be learned by the practice of the invention. The objects and advantages of the invention may be realized and attained by means of the instrumentalities and combinations particularly pointed out in the appended claims.

In accordance with the present invention, a high throughput UART to DSP dual buffer interface includes a UART compatible module attached to a computer's data bus. This UART compatible module being responsive to standard serial communication port commands but connected to a secondary UART to DSP Interface (UDIF) with a parallel data bus. The UART compatible module comprising a block of registers, a control block, two dedicated FIFO buffers to store data. Typically a plurality of standard UART registers includes a scratchpad register (SCR), a modem status register (MSR), a interrupt enable register (IER), a FIFO control register (FCR), a transmit hold register (THR), a modem control register (MCR), a line control register (LCR), a divisor latch low (DLL), a divisor latch high (DLM), an interrupt identification register (IIR), and a receive line status register (LSR). The UART FIFO buffers being optimized for interaction with the computer's data processing units and data bus. One buffer being dedicated to data transmission and the other being devoted to data reception. The secondary UDIF comprising a block of registers, a flow control block, and two dedicated FIFO buffers. These buffers also being optimized, with the optimization focusing on interaction with the digital signal processor (DSP) of the modem.

The DSP is generally not bound by the buffer size constraints legacy software places on the UART and the DSP is more efficient than the host microprocessor in transmitting and receiving data. As a result, the UDIF FIFO buffers are designed larger than those found on the UART compatible module. Larger UART FIFO buffers would not always be efficiently utilized because of artificial buffer size constraints imposed by software. While both the DSP and the UART benefit from an increase in the UDIF FIFO buffers. Another method of optimization involves establishing threshold values within the buffer to alert the DSP when a buffer needs to be filled or emptied. These threshold values should be selected using a method based on the functionality and performance specifications of the DSP and the UART. Care should be taken to minimize the number of processor interrupts, while maximizing the DSP processor data throughput. One additional optimization involves maintaining a FIFO Fill Level Register containing the number of characters stored in the FIFO. This value allows the DSP to avoid checking the FIFO empty flag/FIFO full flag after every data transfer. For large data transfers, this register will reduce the number of DSP operations by 50% to 80%. Without the FIFO Fill Level register, the DSP may execute 2 to 5 times as many instructions per byte transferred. The DSP overhead savings increases according to the size of the data block being transferred. This scenario occurs frequently in the dual FIFO buffering system, because one of the objects of the system is to promote large data block transfers. Thus in utilizing a dual buffering system, the interface can create an optimized and efficient throughput system for both the computer and the modem.

Preferably, the compatible UART module is connected to the computer bus with a bidirectional parallel data interface. While the buffers of the UART compatible module and the UDIF buffers are directional, dedicated parallel data bus lines. The significance of these parallel data bus lines revolves around the nature of the serial modem connection. The computer is expecting the data to be processed in a serial fashion, but throughput can be enhanced by making the transfers across the parallel buses. Advantageously, the modem can actually encode data so that when one bit is sent across the phone line it may represent several data clusters. Under these encapsulation schemes it is important for the DSP to have larger quantities of data available than can be created serially.

In accord with one aspect of the invention, the UDIF registers and control blocks may be enabled to perform the hardware echo function, which returns characters that have just been received from the UART compatible module.

Hardware echo is an important function because it allows the user to see which characters are being sent across the phone line. Thus a hardware implementation of this mode advantageously reduces the overhead on the DSP because it no longer has to redirect the data back to the computer and can focus on encoding the data for transmission.

As another aspect, the UDIF registers may be enabled to generate parity for data being sent and to remove parity from data being received. While the best mode requires a 7-bit word length be enabled for parity generation to be downloaded from the DSP, it is not the only configuration possible. It is anticipated that the device can function even when the word length varies along the standard settings of 4-bit, 5-bit, 6-bit, 7-bit, or 8-bit word lengths. Furthermore, the parity produced can be even, odd, mark, space, or no parity.

For greatest optimization, the UDIF controls the pacing of data transfers by alternatively bursting and halting data transfers to emulate data being serialized through a shift register at a rate dictated by a divisor latch value. The size of the available data burst is indicated by a UDIF register called a pacing burst count register. The length of the data transfer delay is similarly calculated using a UDIF register called a pacing wait count register. Additional hardware flow control mechanisms are employed by the UDIF to increase the throughput rates and reduce the computational overhead on the DSP, while maintaining UART compatibility. One of these flow control mechanisms includes detecting modem escape sequences and completing the sequence with a lessened DSP involvement. Several of these attention (AT) and communication commands can be be preformed by the UDIF to relieve the DSP of the overhead necessary to service the interrupt or preform the function.

The preferred embodiment of the UART to DSP Interface (UDIF) contains Several interface bus lines and various design registers, modules and timing blocks. The buses include a Tx Data Input Bus that receives data blocks from the UART, a Rx Data Output Bus that sends data blocks to the UART, a bidirectional DSP Interface Bus that sends data blocks and control signals to the DSP and receives data blocks and control signals from the DSP, and a control line bus for communication between the interface and the UART.

The UDIF memory blocks include the two FIFO blocks, presently implemented using 128×8 two port memory modules. The Tx FIFO and Rx FIFO memory block store data in 8 bit character blocks, but it is envisioned that the data block size could vary from one byte to 512 bytes according to the system data size. Characters are stored in the Tx FIFO in the order that the characters are transmitted to the Tx FIFO from the UART. The Rx FIFO memory block stores characters in the order the characters are received from the DSP. Closely associated with the two aforementioned FIFO buffers are the Tx FIFO Register and Rx FIFO Register. From the DSP side, the Tx FIFO Register is read only, but it is also electronically attached to the Tx FIFO memory block. Once the DSP reads the Tx FIFO Register, the Tx FIFO Register writes the oldest character from the Tx FIFO over it previous value. The Rx FIFO Register is similar except that it is write-only from the DSP Interface side. And like the Tx FIFO Register, the Rx FIFO Register is also electronically attached to the Rx FIFO memory block except that the Rx FIFO Register writes a character to the newest character slot in the Rx FIFO each time the DSP writes data to the Rx FIFO Register. A quasi memory block found in the preferred embodiment is a sixteen bit general purpose register called the UART Scratch Register (USCR). While the USCR can be read from the UDIF interface with the DSP, the USCR actually resides on the UART side of the interface. The USCR can be used to pass data directly between the host computer and the DSP.

The UDIF provides several control and status registers for the DSP. One of the significant control and monitoring registers provided by the UDIF is the UDIF Modem Control Register (UMCR). The UMCR combines some signals that connect to the UART's MSR, signals that control the setting of some bits in the UART's LSR and a couple of signals that enable functions in the UDIF. In the preferred embodiment this register is an 8-bit register format for easy access by the DSP, but as with any component in this design, the size of the register could be increased or decreased to better optimize the interface with a specific DSP. The bit flags represented in the UMCR include the Parity On (PON) flag that when set conditionally activates a UDIF parity generation module that adds parity to all data blocks before they enter the Tx FIFO and a UDIF parity strip module that removes parity from all data blocks sent to said Rx Data Output.

The Echo On (EON) flag is another bit that when set, conditionally activates a UDIF hardware echo module that routes characters, after performing any parity stripping if it is enabled, from the Tx Data Input bus to the Rx Data Output bus as well as sending the characters to the Tx FIFO. The Data Carrier Detect (DCD) flag is a bit that sets or clears bit 7 of the modem status register (MSR) on a standard UART. Another flag bit attached to the MSR is the Ring Indicator (RI) bit. The RI conditionally activates or deactivates bit 6 of the MSR on the attached UART. The Data Set Ready (DSR) bit is another flag bit connected to the MSR on the attached UART, it conditionally activates bit 5 of the MSR. Finally, the Clear to Send (CTS) bit conditionally activates bit 4 of the MSR on the UART. A smaller string of self clearing bits can also be found in the data stored by the UMCR. These bits are self clearing because, writing to the location does not set the register value. Therefore there is nothing to read, so that a read of these bits will always result in a zero being read. The first of these self clearing bits is the Set Break Interrupt (SBI) bit that activates a Break Interrupt bit in the UART LSR. The second self clearing bit is the Set Rx Overrun (SRO) bit that activates the Overrun Error bit in the UART Receiver Line Status Register (LSR).

A second significant control register in the UDIF embodiment is the UDIF FIFO Control Register (UFCR). The UFCR contains status flag bits in a single register that allow the DSP to control both the Tx FIFO and the Rx FIFO. When the Transfer Disable (TDS) bit is set, it disables data transfers between the UDIF module and the UART module. The Tx FIFO Reset (TFR) bit is a self clearing bit that clears the contents of the Tx FIFO when the bit is set. Similarly, the Rx FIFO Reset (RFR) bit is another self clearing bit that clears the contents of the Rx FIFO when set.

Another important status register is the sixteen bit Divisor Latch (DIVL) register. The DIVL contains the sixteen bit Divisor value from the UART. The DSP can read the DIVL register and determine what the appropriate pacing values should be and set them. Once the DSP has made this calculation, it writes a sixteen bit value to the Character Pacing Count Register (CPCR). This value represents a data block character transfer time period and is used to pace data flow in both the Rx and Tx directions. A related sixteen bit Pacing Burst Count Register (PBCR) contains a value that indicates the number of characters that should be transferred during a data burst before halting the data transfer for both the Tx and Rx directions. Similarly, a sixteen bit Pacing Wait Count Register (PWCR) contains a value representing the number of data block \ character transfer time periods during which data transfers are halted in both the Tx and Rx directions. While the actual bursting and halting functions do not have to coincide for the Tx and Rx data lines, they must share be the same length. In another pacing related register, a Tx Stale Count Register (TSCR) contains a sixteen bit stale counter value representing inactive character transfer time periods that may occur before a stale time-out interrupt will be sent to the DSP. If there is at least one character in the Tx FIFO and a TSCR +1 number of character times elapse while there were no accesses to the Tx FIFO, then the UDIF will send a stale time-out interrupt to the DSP.

An important UDIF status register is the 8 bit read only Frequently Updated Status Register (FUSR). This register contains bits that frequently change, in particular it provides 11 status signals for the Rx FIFO, the Tx FIFO, and the Request To Send (RTS) signal from the UART's MCR bit 1. The Tx Character Time-out (TCT) bit is set when no characters have been removed from or input in to the Tx FIFO for a time period equivalent to the value in the TSCR and the FIFO contains at least one character. The TCT bit is cleared by reading the Tx FIFO. The Tx FIFO Full (TFF) bit is set when the Tx FIFO is full and zero when the Tx is not fill. The Tx FIFO Threshold (TFT) bit is set when the number of characters in the Tx FIFO is greater than the threshold value and zero when the number of data blocks in the Tx FIFO is less than or equal to the threshold value. The Tx FIFO Empty (TFE) bit is set when the Tx FIFO is empty and zero when the Tx FIFO is not empty. The Rx FIFO Full (RFF) bit is set when the Rx FIFO is full and zero when the Rx is not full. The Rx FIFO Threshold (RFT) bit is set when the number of data blocks in the Rx FIFO is less than or equal to the threshold value and zero when the number of characters in the Rx FIFO is greater than the threshold value. Finally, the Rx FIFO Empty (RFE) bit is set to indicate when the Rx FIFO is empty and zero when the Rx FIFO is not empty.

Another important feature of the preferred embodiment is knowing the fill level of the Rx FIFO and Tx FIFO. This enables the DSP to empty or fill the respective FIFO with less overhead than a standard interface. One of these registers is the read only Rx FIFO Fill Level Register (RFFL) that contains an 8-bit value representing the number of characters in the Rx FIFO. The RFFL is cleared when the Rx FIFO is reset. Similarly, the read only Tx FIFO Fill Level Register (TFFL) contains an 8-bit value representing the number of characters in the Tx FIFO. The TFFL is cleared when the Tx FIFO is reset.

Two of the most valuable registers in the preferred embodiment are the Rx FIFO Threshold Register (RFTR) and the Tx FIFO Threshold Register (TFTR). These registers allow the DSP to optimize the efficiency of the UDIF FIFO buffers in the Tx and Rx directions. The DSP can set the threshold value by writing an eight value to either the RFTR or TFTR. This value is important because it tells the UDIF how often the DSP wants to be interrupted and how long a transfer with the UART should occur before emptying or filling the UDIF Tx FIFO and Rx FIFO. By adjusting the RFTR and TFTR, the DSP can optimize its throughput levels.

The Rarely Updated Status Register (RUSR) is a non-destructive 16-bit read only status register containing bits that rarely change. The lower half of the register echoes signals from the UART's Modem Control Register (NCR), Line Control Register (LCR), and FIFO Control Register (FCR). The signals from the LCR include the Stick Parity Select (SPS) bit that displays the value of bit 5 of the UART LCR, the Even Parity Select (EPS) bit that displays the value of bit 4 of the UART LCR, the Parity Enable (PEN) bit that displays the value of bit 3 of the UART LCR, the Set Break (SB) bit that displays the value of bit 6 in the UART LCR, and a 2 bit Word Length String (WLS) used to indicate the selected word length by displaying the value of bit 0 and bit 1 of the UART LCR. The signal from the MCR is the Data Terminal Ready (DTR) bit that displays the value of bit 0 in the MCR. The FCR signal is the UART FIFO Enable (UFE) bit that displays the value of bit 0 of the UART FCR.

The upper eight bits of the RUSR represent signals from registers set whenever a change has been made in the respective register. For example, the Delta Scratch Register (SCR) bit indicates that a write occurred to the UART Scratch Register by a Host Microprocessor. The Delta Divisor Latch Register (DIVL) bit indicates when the UART Divisor Latch Register is written to by said Host Microprocessor. The Delta Set Break (SB) bit indicates a change in the Set Break flag. The Delta Data Terminal Ready (DTR) bit indicates a change in the Data Terminal Ready flag. The Delta Uart FIFO Enable (UFE) bit indicating a change in the UFE flag.

Another method of accessing the RUSR is through the destructive sixteen bit read only Rarely Updated Status Register (RUSRclr). When the DSP reads this address location it is the same as reading the RUSR except that the read clears the delta bit flags in the upper bits of the register following the read. Specifically, the delta bits DIVL, UPS, SB, DTR, and UFE are reset.

Finally, if any of the Delta bits in the RUSR are set, the UDIF can write to the Status Interrupt Enable Register (SIER) to set several Interrupts to the DSP at once. The USCR Interrupt Enable bit enables an interrupt to the DSP when new material is waiting in the SCR. The DIVL Interrupt Enable bit enables an interrupt to the DSP when a new transfer rate value is waiting in the UART DIVL. The UPS Interrupt Enable bit enables an interrupt to the DSP when there is a change in the parity settings or in the word length settings. The SB Interrupt Enable bit enables an interrupt to the DSP when there is a change in the SB flag. The DTR Interrupt Enable bit enables an interrupt to the DSP when there is a change in the DTR flag. The UFE Interrupt Enable bit enables an interrupt to the DSP when there is a change in the UFE flag. This register is very important as it provides the UDIF with the ability to determine which of the delta bits will affect the interrupt and improve the DSP efficiency.

The high throughput UART to DSP interface thus minimizes the number of times that a modem processor and a computer processor need to be interrupted to service data transfers. In fact, many of the functions previously accomplished through a software implementation can now be more efficiently completed with the hardware interface. These commands include parity generation and removal, hardware echo, data transfer pacing, recognition and completion of escape commands, AT commands, and basic flow control commands. The parallel nature of the data transfer ensures that the transfer between modem and computer occurs in less time that a serial transfer would require, but the hardware pacing ensures that the transfer appears to function like a serialized transfer to the computer. Thereby creating compatibility with legacy software expecting serial communication.

Still other advantages of the present invention will become readily apparent to those skilled in the art from the following detailed description, wherein the preferred embodiment is shown and described, simply by way of illustration of the best mode contemplated by the inventors in carrying out the invention. As will be realized, the invention is capable of modifications in various obvious respects, all without departing from the invention. Accordingly, the drawings and description are to be regarded as illustrative in nature, and not as restrictive. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which:

FIG. 3, comprising FIG. 3(a)–3(g), is a timing diagram of waveforms produced upon implementation of the preferred embodiment of the invention between the two control modules of the interface.

DETAILED DESCRIPTION OF THE ILLUSTRATED EMBODIMENT

Figure 1:
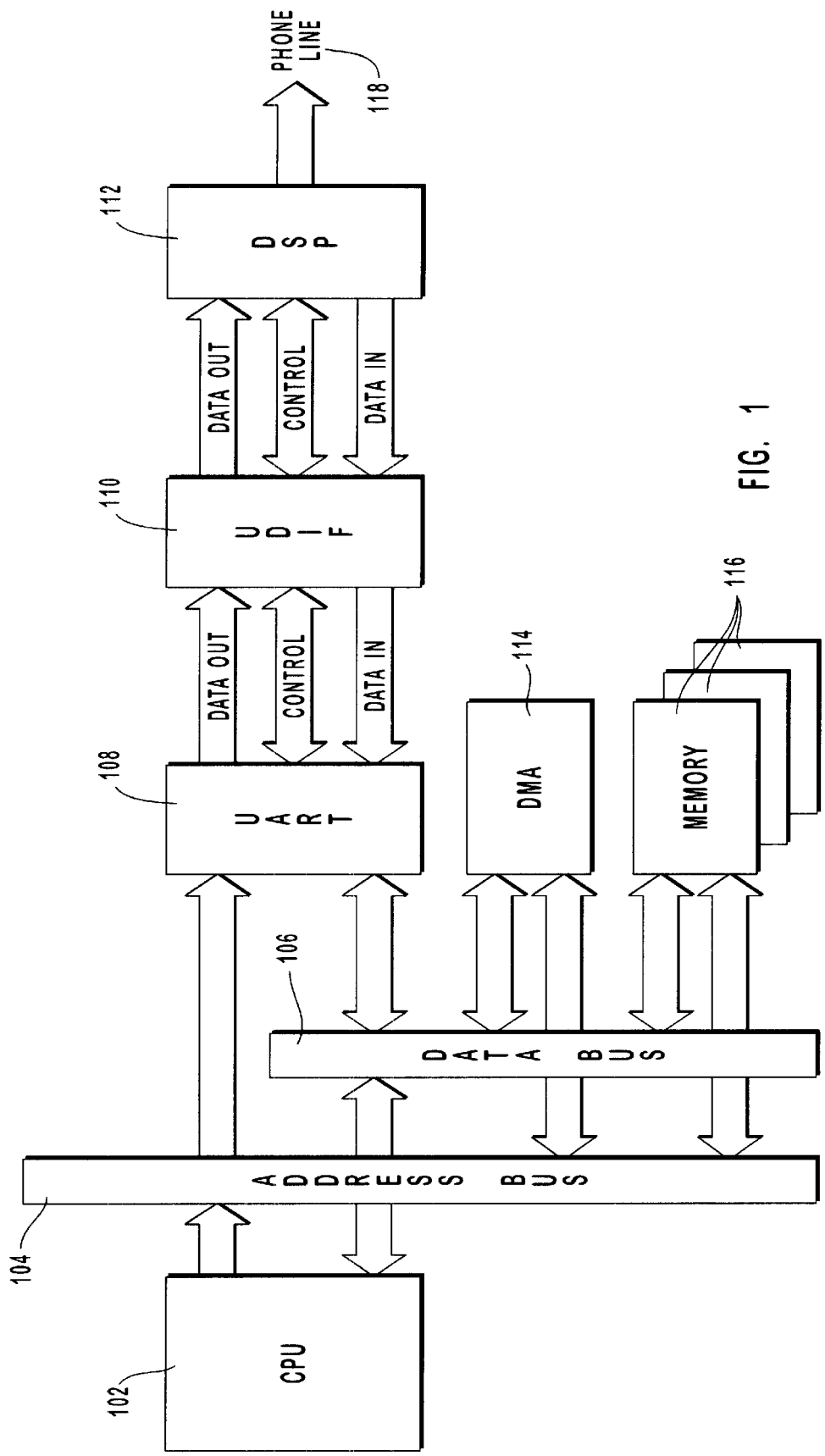
FIG. 1 is a block diagram schematically illustrating data flow between the CPU and the phone line.

FIG. 1 is a block diagram schematically illustrating a system for processing data flow from the central processing unit 102 of a personal computer unit to a telephone line 118. The invention representing the high throughput Input/Output device is illustrated in FIG. 1 between the Data Bus 106, Address Bus 108, and digital signal processor (DSP) 112. The device comprises two design blocks or component modules. The first component module is the primary data transfer module as illustrated by the UART compatible block 108 connected to the host computer Data Bus 106 and Address Bus 108. The Data Bus 106 provides parallel connections to the UART 108 through the DataIn and DataOut buses illustrated in FIG. 2. The second component module is the secondary data transfer module as illustrated by the UDIF block 110 connected to the DSP 112. In the computer system shown in FIG. 1, data is produced and placed upon the data bus 106 from either the processing unit 102, the direct memory access cache 114, or the permanent memory blocks 116. The data is sent from the data bus 106 to the UART 108 which is then passed through the UDIF 110 to the DSP 112. The DSP 112 converts and encapsulates the digital data information into an analog form for introduction onto the telephone line.

When information is being received, the DSP 112 passes the data to the UDIF 110 and the UDIF 110 passes, in synchronous fashion, data to the UART 108. The data is then transferred to one of the destinations specified by the processing unit 102 of the personal computer. Although FIG. 1 shows that the data information being transferred is in a modulated synchronous format, this data information being passed through the UDIF 110 and UART 108 to the DSP 112 may be of any type of modulated data including facsimile information, modulated asynchronous data, and modulated data from local area networks. Furthermore, while the source of the data to the DSP 112 is shown over a common phone line in FIG. 1, it can be appreciated that the data information and modulated data may be obtained through separate individual sources. The directional naming convention used to describe data block transfers is as follows: the Rx, or receive, direction refers to data from the DSP 112 to the host computer and the Tx, or transmit, direction refers to data being transferred from the host computer to the DSP 112.

Figure 2:
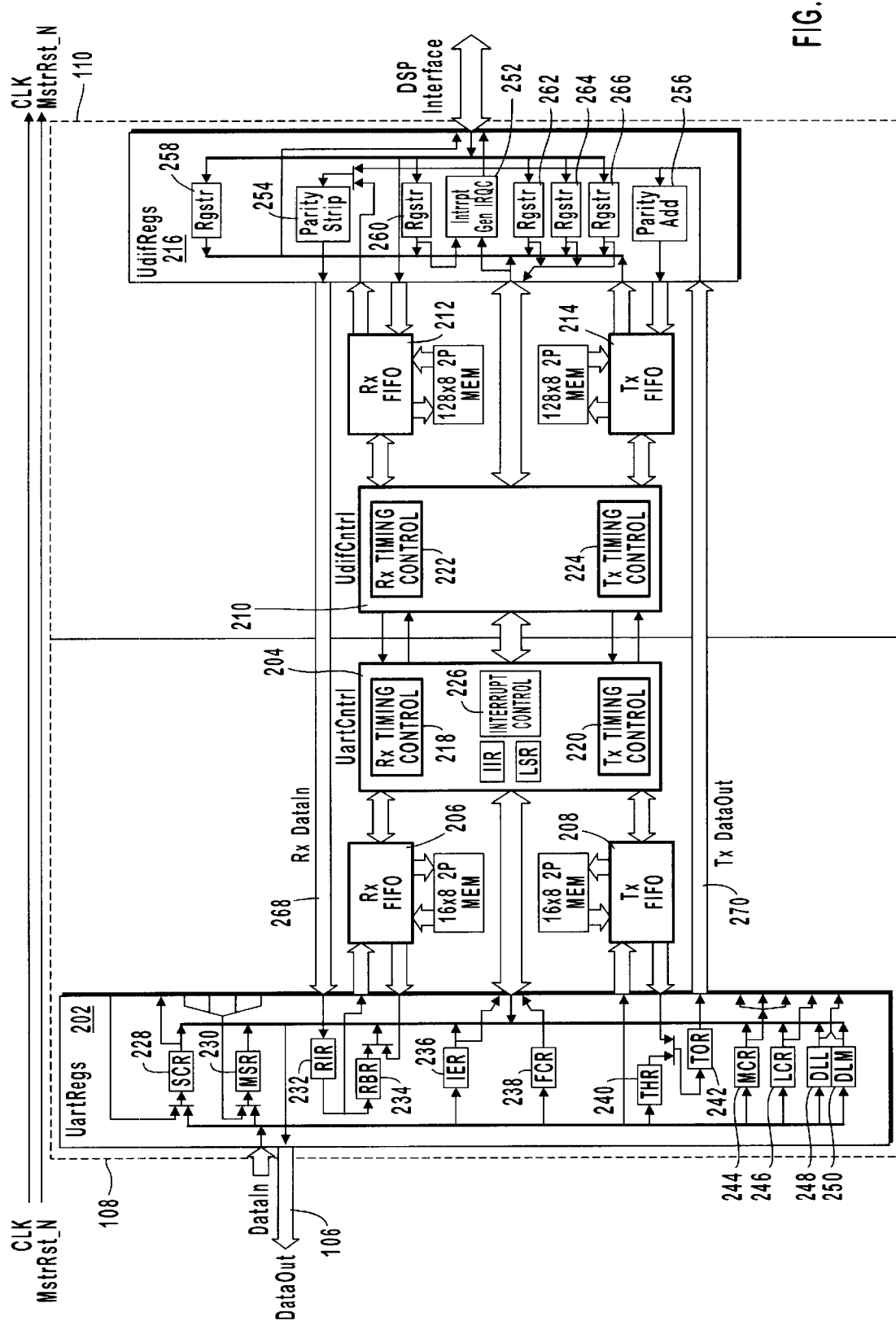
FIG. 2 is a block diagram schematically illustrating an embodiment of the high throughput interface.

FIG. 2 provides a more detailed block diagram of the invention. The two main modules of the invention are the primary data transfer module illustrated as the UART 108 and the secondary data transfer module illustrated as the UDIF 110. The UART 108 contains a plurality of standard UART registers including a scratchpad register (SCR) 228, a modem status register (MSR) 230, a interrupt enable register (IER) 236, a FIFO control register (FCR) 238, a transmit hold register (THR) 240, a modem control register (MCR) 244, a line control register (LCR) 246, a device latch low (DLL) 248, a device latch high (DLM) 250. The illustrated interrupt control module 226 include an interrupt identification register (IIR), and a receive line status register (LSR).

It can be appreciated that many variations of the UART 108 can be implemented, for example, the best mode presently uses a NS 16550 UART but the new 16650 UART could also be implemented. The UART module 108 provides a partial path for data to reach the DSP from the host computer with the UDIF 110 completing the data path. In the preferred embodiment the UART 108 appears to be a NS 16550 UART from the perspective of the central processing unit 102 of the host computer. The primary register module illustrated as the UART registers 202, the primary control module illustrated as the UART control module 204, control loop-back modes and delays are all implemented within the UART module 108. On the DSP 112 side of the UDIF module 110, the data remains parallel; it is never actually serialized in this implementation. Host legacy software doesn't know this, so provisions are made in the hardware and firmware to emulate the expected delays of a traditional UART 108. What would normally be the serial interface on a UART 108 is replaced with an 8 bit parallel interface. To better emulate the 16550 functionality, two registers, the Receive In Register (RIR) 232 and Transmit Output Register (TOR) 242, are provided which are the equivalent to the 16550 UART shift registers but do not perform any shifting. The transfer of data at this interface is not determined by the UART module 108 but by the DSP 112 through the UDIF module 110.

The UART 108 varies from the standard 16550 UART in the following ways: First, there is no baud rate generator. The divisor value comprised of values from the divisor latch low (DLL) register 248 and divisor latch high register (DLH) 250, is passed onto a sixteen bit Divisor Latch (DIVL) register in the UDIF 110. The DSP 112 uses the value to determine the rate at which the data is transferred to and from the inventive UART module 108. The actual rate control, or pacing is handled by the UDIF interface 110 based upon the DSP's results stored in DIVL register. Second, there has been some control added to allow the host computer to have the ability to load or receive more than 16 characters during a given interrupt service routine (ISR) access. This is done by controlling the setting of the empty flag for the transmit hold register (THR) 240 and the Receive Buffer Register (RBR) 234. Third, all parity modes determined by the line control register (LCR) 296 are not supported by the UART compatible module 108 but are handled by the invented UDIF 110 or DSP 112. In the illustrated embodiment of the invention, the DataIn and DataOut buses provide parallel connections to the UART 108 and illustrated in FIG. 2.

Some of the potential enhancements or variations of this invention include, increasing the size of the FIFOs, one look direct access modem status and control, and a serial backend instead of the present parallel backend. The throughput of the invention using the two-tiered FIFO buffering may be enhanced by increasing the size of the UART Rx FIFO buffer 206 and Tx FIFO buffer 208 and increasing the size of the UDIF Rx FIFO 212 and UDIF Tx FIFO 214. While a parallel UART backend is the preferred configuration, the DSP efficiency can be improved even with a serial backend. Dual buffering and one look direct access status and control devices increase the DSP efficiency by minimizing the overhead associated with communication with a UART. In a serial implementation, the actual transfer between the UART and UDIF may take longer, but this delay simply allows the DSP to work on other tasks until the UDIF FIFO threshold is met.

The second main module of the invention is the UART to DSP Interface (UDIF) 110. The UDIF 110 contains a UDIF Control Module 210, a UDIF Register Module 216, an Rx FIFO with Rx FIFO Register 212, and a Tx FIFO with Tx FIFO Register 214. The UDIF 110 focuses its hardware on reducing the DSP 112 overhead for certain functions and increasing throughput with the UART 108. One way that the UDIF 110 lowers DSP 112 overhead is by providing easy access to modem status and control signals. The DSP 112 controls the CTS, DSR, DCD and RI flags which lead into the modem status register (TSR) 230, as well as being able to set the break interrupt and the Rx overrun error, through the UDIF Modem Control Register (UMCR). The DSP 112 is also able to access the scratch register (SCR) 228 through the UDIF's UART Scratch Register (USCR). The purpose of this feature is to provide a path for the host computer 02 to communicate to the DSP 112. The DSP 112 can both read the SCR 228 and write to the SCR 228, with a host central processing unit 102 (FIG. 1) access taking priority if the host computer and the DSP try to write to the SCR 228 simultaneously. A flag in UDIF's Rarely Updated Status Register (RUSR) is set whenever the host central processing unit 102 writes to the SCR 228, providing a way to inform the DSP 112 that there is data waiting for it to look at.

When data is received from the DSP 112, the UDIF 110 may either place the information in the receive memory buffer or into one of the UDIF Registers 216. The receive memory buffer is illustrated in FIG. 2 as the Rx FIFO 212, a 128×8 two-port memory module. The UDIF Registers 216 include the UDIF Modem Control Register (UMCR), the UDIF FIFO Control Register (UFCR), the Divisor Latch Register (DIVL), the Rarely Updated Status Register (RUSR), the Frequently Updated Status Register (FUSR), the Status Interrupt Enable Register (SIER), the Rx FIFO Fill Level Register (RFFL), the Tx FIFO Fill Level Register, the Rx FIFO Threshold Register, the Tx FIFO Threshold Register, the Character Pacing Count Register (CPCR), the Pacing Wait Count Register (PWCR), the UART Scratch Register (USCR), the destructive RUSR Register (RUSRclr), and the Tx Stale Count Register (TSCR) a portion of which are illustrated in FIG. 2 by the registers 258–266.

Data in the Rx FIFO 212 is transferred based on control signals from the UDIF Control Module 210 to the receive data in (Rx Data In) bus 268 directly to the UART registers 202 based on the status of the UART Rx FIFO 206, a 16×8 two-port memory module. The data is either placed into the UART Rx data FIFO 206 or passed directly to the data bus 106 of the host computer system. When data is to be transmitted it is taken from the data bus 106 of the personal computer system, routed to the transmit FIFO 208 of the UART which can be a 16×8 two-port memory module and then based on the Tx Timing Control module 220 of the UART control module 204 this data is transmitted through to the UDIF 110. The UDIF Tx Timing Control module 224 can place this information into the Tx FIFO 214, a 128×8 two-port memory module, or with the additional help of the UDIF Rx Timing Control module 222 the data can be placed back onto the Rx Data In Bus 268. The size of the Tx FIFO 214 allows UDIF 110 to pass large blocks onto the DSP 112 for signal processing and encapsulation.

The UART Interface Control between the UART 108 and UDIF 110 modules operates synchronous to the UART clock and is illustrated in FIG. 3. FIG. 3A is the synchronous clock signal sent to the timing control modules: UART Rx Timing Control 218, UART Tx Timing Control 220, UDIF Tx Timing Control 224, and UDIF Rx Timing Control 222. Each timing control module helps the transmission of data across their respective data buses. One of the ways the UDIF Rx Timing controls this transfer is through the RxDataAvail signal as illustrated in FIG. 3B. The UART Rx Timing Control module 218 responds with a enabling signal illustrated in FIG. 3C. FIG. 3D illustrates the conditions and timing of data transfers across the Rx Data In Bus 268. The transmit signals are independent of the receive signals, but they do follow the same clock cycle. FIG. 3E illustrates the UART Tx timing control 220 signal to the UDIF Tx timing control module 224. FIG. 3F is a sample transmission read enablement signal. Combining the transmission signals results in the data transmission pattern illustrated in FIG. 3G.

Among other signals, this interface allows the UDIF 110 to control the data transfer in both Rx and Tx directions. The UART 108 provides two status signals, Tx Data Available and Rx Data Available, to the UDIF 110. On the receive side the Rx data available signal indicates that there is space available in the UART 108 to transfer characters from the UDIF 110. On the transmit side, the Tx data available signal indicates there is data available in the UART 108 to transfer data to the UDIF 110. The UDIF asserts either the Rx data write enable or the Tx data read enable signal to complete a transfer. FIG. 3 is a timing diagram which illustrates the necessary interaction of these signals.

Character time calculation is essential to the process of pacing. A character time is the amount of time needed to transmit one character at the baud rates specified by the host personal computer through the divisor latch (DIVL). In FIG. 1, The DSP 112 determines the character time for the UART 108 by reading the DIVL and performing the appropriate calculations. The DSP 112 then provides the character time count back to the UART 108 via the UDIF control module 210. This count will be used to load separate counters for the Rx and Tx sides that count out one character time. The Rx character time is used in determining Rx timeout errors. The Tx character time is used for Tx transfer control.

The Tx transfer control is used to control the behavior of the transmit hold register (THR) 240 empty flag and interrupt. This control can allow for a higher throughput than would normally be achieved with a 16550 UART. The invention allows the Tx FIFO 208 to be emptied faster than the host computer processor 102 can feed it across the data bus 106 yet controlling the THR 240 empty IRQ so that the host does not get hit with multiple interrupts while it is trying to transfer a sixteen character block of data. The physical interrupt to the host computer is held off until the host computer completes the block transfer. However, the bit fields in the IIR indicate that the Tx FIFO is empty, thus stimulating the host computer to refill the Tx FIFO 208. The UDIF module 110 of this invention contains a 128 character-deep Rx and Tx FIFO. These buffers allow higher throughput rates than can be achieved with the invented UART 108 alone. The UDIF 110 also provides a set of status and control registers to the DSP that allow the DSP to control the transfer of data. Also, several UART status and control module 204 signals, as well as the scratch register 228, are accessible through the UDIF 110. The Rx FIFO 212 and Tx FIFO 214 are accessible through a single address location. Status signals are provided along with the appropriate IRQ flags for the buffers. These IRQ flags must go through an IRQC module 252 to be combined into a single IRQ to the DSP. Three other functions that the UDIF 110 performs are hardware echo, parity generation through parity add and parity strip, and pacing control.

Hardware echo provides the ability to transmit characters that have just been received from the UART 108 to be immediately sent back to the UART 108. Hardware echo is enabled by the DSP 112. The insertion of Tx data into the Rx data stream occurs as follows: the Rx data input bus 268 receives data from the Tx data output 270 when the hardware echo is turned on and there is Tx data that can be loaded into the Tx FIFO; otherwise, the Rx data output receives data from the Rx FIFO.

In the preferred embodiment, the parity generation module 256 and the parity stripping module 254 are enabled when both the UDIF 110 and UART 108 have their parity enable bits set and seven bit word length is selected. When parity is enabled, the UDIF 110 generates parity in the Parity Add 256 module for all Tx data before it enters the Tx FIFO 214 and has parity stripped in the Parity Strip 254 module from all Rx data before it is sent to the UART 108 across the Rx Data In bus 268. While the preferred embodiment is limited to the seven bit word length, it is anticipated that other formats for parity generation could be supported in other embodiments.

In order for it to appear to the host computer 102 that the UART 108 is serializing the data, transfers are delayed, or "paced" to where they would occur if the data were serialized through a shift register at the rate indicated by the divisor latch value 248 and 250. The UDIF 110 controls the flow of data between the UART 108 and the UDIF 110 by alternatively bursting and halting transfers for an effective throughput that is equivalent to the host expected data rate. The UDIF will burst characters until the number of characters transferred is equal to the value contained in the pacing burst counter register (PBCR) and then it will halt transfers for a number of character times determined by the pacing wait count register (PWCR). Pacing is disabled when the value in the PWCR is equal to 0. Pacing control is independent for the Rx and Tx directions. In other words, the data flow in the Rx direction does not have to be bursting at the same time as the Tx is bursting, nor does it have to be waiting at the same time. The same timing restraints apply for the data flow in the Tx direction. When a FIFO buffer starts bursting or waiting can be at completely different times from when the other buffer starts bursting or waiting, although the timing elements for both directions have to have identical burst and wait durations. In other words, the start of the burst does not necessarily need to be synchronized but the length of the wait time and the burst time should be identical. A stale count interrupt will be set if there is at least one character in the Tx FIFO and a TSCR+1 number of data block transfer time periods elapses without any access to the Tx FIFO.

In summary of the preferred embodiment of the invention, the high throughput UART to DSP interface maintains UART functionality while integrating dual Transmit (Tx) and Receive (Rx) FIFO buffers optimized for interaction with the respective I/O processors. The portion of the interface design interacting with the DSP, the UDIF, provides several unique informational and Control registers that lower the DSP overhead required for many of the basic modem functions. For example large data block transfers can be completed in a fraction of the standard access times because the DSP reads the value stored in the FIFO Fill Level registers and conducts that many reads or writes. This dramatically shortens the standard read FIFO then check if empty procedure presently implemented by most protocols for the DSP. On the modem control side, compiling the UART flags and interrupts into registers allow the DSP to efficiently handle the interrupts and set or read several flags at once. The LDIF design also performs parity add, parity strip, and character echo functions, traditionally performed at a high overhead cost by the DSP. These functions are more efficiently preformed by a hardware implementation than by the software routines executed by the DSP. The added hardware functionality takes some of the burden off of the DSP, which is already heavily burdened performing the actual modem functions. More burdensome command functions like escape, AT, and flow control commands can also be implemented in hardware to reduce processor overhead.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A high throughput digital Input/Output device comprising:

a primary data transfer module compatible with standard UART protocols and timing requirements; and a secondary data transfer module electronically linked to a digital signal processor;

said primary data transfer module comprising, a primary register module, a primary control module, a primary transmit FIFO and a primary receive FIFO;

said FIFOs being selectively adjusted in defined useable size for efficient interaction with a host computer and data transfer architecture, said primary data transfer module being electronically connected to the secondary data transfer module;

said secondary data transfer module comprising, a secondary register module, a secondary control module, a secondary transmit FIFO and a secondary receive FIFO, said secondary FIFOs being selectively adjusted in defined useable size for interaction with said digital signal processor.

2. The high throughput digital Input/Output device as in claim 1, wherein said primary data transfer module further comprises a parallel bidirectional data interface to the host computer data bus; said secondary data transfer module having a parallel bidirectional data interface with said digital signal processor; said secondary and primary data transfer module sharing a parallel directional receive data bus to said secondary data transfer module and a parallel directional transmit data bus to said secondary data transfer module.

3. The high throughput digital Input/Output device as in claim 2, wherein said secondary receive FIFO buffer is larger than said primary receive FIFO buffer; and said secondary transmit FIFO buffer is larger than said primary transmit FIFO buffer.

4. The high throughput digital Input/Output device as in claim 3, wherein said primary transmit FIFO buffer is a two port 16×8 FIFO and said primary receive FIFO buffer is a two port 16×8 FIFO; and said secondary transmit FIFO buffer is a 128×8 two port FIFO and said secondary receive FIFO buffer is a 128×8 two port FIFO.

5. The high throughput digital Input/Output device as in claim 1 wherein said secondary data transfer module may, upon enablement by said digital signal processor, transmit characters that have just been received from the primary data transfer module immediately back to the primary data transfer module.

6. The high throughput digital Input/Output device as in claim 5, wherein said secondary data transfer module conditionally generates parity when both the secondary data transfer module and the primary data transfer module have parity enabled and 7-bit word length selected, parity is added for all transmitted data before it enters the secondary transmit FIFO buffer and parity is stripped from all received data before said received data is transferred to the primary data transfer module.

7. The high throughput digital Input/Output device as in claim 6 wherein said secondary data transfer module paces the transfer of data from the primary data transfer module to the secondary data transfer module by alternatively bursting and halting data transfers to emulate data being serialized through a shift register at a rate dictated by a divisor latch value;

said bursting data transfer occurring until the number of characters transferred is equal to the value contained in a pacing burst count register;

said halting data transfer occurring for a time period equal to a number of character transfers determined by a pacing wait count register;

pacing is disabled when said pacing wait count register is equal to zero.

8. The high throughput digital Input/Output device as in claim 7 wherein said secondary data transfer module automatically detects the initiation of modem escape sequences from either the digital signal processor or the primary data transfer module and completes the escape sequence without processor intervention.

9. The high throughput digital Input/Output device as in claim 8 wherein said secondary data transfer module handles flow controls automatically.

10. The high throughput digital Input/Output device as in claim 8 wherein said secondary data transfer module can detect and complete AT commands without additional involvement of the digital signal processor or the host computer.

11. A high throughput null UART comprising:

a UART including: a UART register module, a UART control module, a UART transmit character buffer and a UART receive character buffer; said UART being compatible with standard protocols and timing requirements for transmit and receive data exchanges, the UART being electronically linked to a microprossor;

a UART to DSP Interface (UDIF) including: a UDIF register module, a UDIF control module, a UDIF transmit character buffer larger than the UART transmit character buffer and a UDIF receive character buffer larger than the UART receive character buffer; said UDIF being electronically linked to a digital signal processor.

12. The high throughput null UART as in claim 11, wherein said UART transmit character buffer is a two port 16×8 FIFO and said UART receive character buffer is a two port 16×8 FIFO; and said UDIF transmit character buffer is a 128×8 two port FIFO and said UDIF receive character buffer is a 128×8 two port FIFO.

13. The high throughput null UART as in claim 11, wherein said UDIF may, upon enablement by said digital signal processor, transmit characters that have just been received from the UART immediately back to the UART.

14. The high throughput null UART as in claim 13, wherein said UDIF conditionally generates parity when both the UDIF and the UART have parity enabled where parity generation occurs as follows:

parity is added for all transmitted data before it enters the UDIF transmit character buffer; and parity is stripped from all received data before said received data is transferred to the UART.

15. The high throughput null UART as in claim 14, wherein said UDIF paces the transfer of data from the UART to the UDIF by alternatively bursting and halting data transfers to emulate data being serialized through a shift register at a rate dictated by a divisor latch value;

said bursting data transfer occurring until the number of characters transferred is equal to the value contained in a pacing burst count register;

said halting data transfer occurring for a time period equal to a number of character transfers determined by a pacing wait count register.

16. The high throughput null UART as in claim 15, wherein said UDIF automatically detects the initiation of modem escape sequences from either the digital signal processor or the UART and completes the escape sequence with minimal processor intervention.

17. The high throughput null UART as in claim 16, wherein said UDIF handles modem flow controls automatically.

18. The high throughput null UART as in claim 16, wherein said secondary data transfer interface can detect and complete AT modem commands without additional involvement of the digital signal processor or the host computer.

19. A high throughput UART to DSP Interface (UDIF), comprising:

a DSP Interface Bus;

a UART Interface Control Bus;

a Tx Memory Module for storing data to be transmitted to the DSP;

a Rx Memory Module for storing data received from the DSP;

a UDIF Register Module electronically connected to the UART Interface Bus and the DSP Interface Bus;

a Tx Register electronically connected to the Tx Memory Module and the UDIF Register Module, said Tx Register reads data from the Tx Memory Module each time the UDIF Register Module reads the Tx Register;

a Rx Register electronically attached to the Rx Memory Module and the UDIF Register Module, said Rx Register writes data to the Rx Memory Module each time the UDIF Register Module writes data to the Rx Register;

a UDIF Control Module electronically connected to the UART Interface Bus, the UDIF Register Module, the Tx Register, and the Rx Register;

a UDIF Modem Control Register electronically connected to the UDIF Register Module and the UDIF Control Module, said UDIF Modem Control Register containing a string of modem status flags stored as bits thereby providing the DSP and UART permissive access to the UDIF Modem Control Register using a register read operation and also providing the ability to change the modem control and transmission settings using a register write operation.

20. The UDIF as recited in claim 19, wherein the UDIF performs parity generation using a parity add module and a parity strip module; said parity strip module removing parity from data being electronically transfered from either the Rx Memory Module or the UART Interface Bus and placing the data on the UART Interface Bus; said parity add module adding parity to data being electronically transferred from the UART Interface Bus to the Tx Memory Module.

21. The UDIF of claim 19, wherein the UDIF Modem Control Register contains control bit indicators, comprising; Parity On (PON); Echo On (EON); Data Carrier Detect (DCD); Ring Indicator (RI); Data Set Ready (DSR); and Clear to Send (CTS); the UDIF Modem Control Register further containing self clearing bit indicators, comprising; Set Break Interrupt (SBI); and Set Rx Overrun(SRO).

22. The UDIF as recited in claim 19, wherein the UDIF performs a character echo function through hardware comprising the steps of:

first, receiving a character signal from a UART;

second, re-routing said character signal such that the UART receives the character signal it just transmitted to the DSP interface.

23. The UDIF as recited in claim 19, wherein the DSP interface control module performs modem flow control commands without control being transferred or being controlled by the DSP, said modem flow control commands comprising: auto detection, data flow control, escape, and attention.

24. The UDIF as recited in claim 21, wherein the UDIF Control Module performs pacing control commands of the Rx Memory Module and Tx Memory Module for the DSP.

25. The UDIF of claim 19, wherein the Tx Memory Module is a 128×8 two port FIFO memory module electronically connected to said Tx Memory Module Register and the Rx Memory Module is a 128×8 two port FIFO memory module electronically connected to said Rx Memory Module Register.

26. The UDIF as recited in claim 19, wherein the UDIF paces the transmission of data between the UART and the DSP according to threshold levels set by the DSP.

27. The UDIF of claim 26, wherein the UDIF maintains a Fill Level count for the Rx Memory Module and Tx Memory Module increasing efficient data communication between the DSP and UART.

28. A UART hardware assisted high throughput DSP interface comprising:

a UART registered data in bus digitally connected to the interface;

a UART registered data out bus digitally connected to the interface;

a plurality of standard UART registers digitally connected to the interface and registered data buses;

a UART receive FIFO utilizing two port memory modules digitally connected to the plurality of standard UART registers;

a UART transmit FIFO utilizing two port memory modules digitally connected to the plurality of standard UART registers;

receive and transmit timing control modules digitally connected to the standard UART registers;

a UART control module digitally connected to the interface and the standard UART registers, said UART control module having a receive data write enable signal as an input, a receive data available signal as an output, a receive overrun signal as an input, a set break interrupt signal as an input, a FIFO enable signal as an output, a character time counter as an input bus, a transmit data read enable signal as an input, a transmit data available signal as an output;

a UDIF control module digitally integrated into the interface;

a UDIF receive FIFO which is a larger two port memory module than used in the UART receive FIFO digitally connected to the interface and the UDIF control module;

a UDIF transmit FIFO which is a larger two port memory module than used in the UART transmit FIFO digitally connected to the interface and the UDIF control module;

a UDIF register module digitally connected to the UDIF control module, the UDIF transmit FIFO, the UDIF receive FIFO, and the interface.

* * * * *

UNITED STATES PATENT AND TRADEMARK OFFICE
CERTIFICATE OF CORRECTION

PATENT NO. : 6,381,661 B1  
DATED : April 30, 2002  
INVENTOR(S) : Shayne Messerly, Harrison Killian and David Arnesen It is certified that error appears in the above-identified patent and that said Letters Patent is hereby corrected as shown below:

Column 1,  
Line 62, change "16540" to -- 16450 --  
Line 64, change ";" to -- , --  
Line 67, change "16540" to -- 16450 --

Column 2,  
Lines 1, 21 and 30, change "16540" to -- 16450 --

Column 6,  
Line 59, change "block character" to -- block \ character --

Column 7,  
Line 15, delete "11"  
Line 63, change "(NCR)" to -- (MCR) --

Column 8,  
Line 20, change "Uart" to -- UART --

Column 11,  
Line 34, change "(TSR)" to -- (MSR) --  
Line 39, change "02" to -- 102 --

Column 12,  
Line 54, change "The" to -- the --

Column 14,  
Line 23, change "LDIF" to -- UDIF --

Signed and Sealed this

Eighteenth Day of February, 2003

JAMES E. ROGAN  
*Director of the United States Patent and Trademark Office*